US005101473A

United States Patent [19]

Kotaki

[11] Patent Number: 5,101,473

[45] Date of Patent: Mar. 31, 1992

[54] DATA PRINTING SYSTEM WITH PRINTING POSITION CORRECTION FUNCTION

[75] Inventor: Kozi Kotaki, Tokyo, Japan

[73] Assignee: Kabushiki Kaisha Toshiba, Kanagawa, Japan

[21] Appl. No.: 730,392

[22] Filed: Jul. 15, 1991

Related U.S. Application Data

[63] Continuation of Ser. No. 515,328, Apr. 27, 1990, abandoned, which is a continuation of Ser. No. 238,230, Aug. 26, 1988, abandoned.

[30] Foreign Application Priority Data

Aug. 26, 1987 [JP] Japan ............................... 62-210281

[51] Int. Cl.[5] ........................ G01D 3/08; G06K 15/22

[52] U.S. Cl. .................................... 395/111; 395/105; 346/68; 346/33 ME

[58] Field of Search ....................... 364/579, 523, 520; 346/68, 70, 33 ME; 101/DIG. 36; 235/455, 485

[56] References Cited

U.S. PATENT DOCUMENTS 3,052,408 9/1962 Cunningham et al. ............ 235/485
3,632,991 2/1970 Brinning ............................ 235/435
4,485,447 11/1984 Ericsson ............................ 364/469
4,520,389 5/1985 Hornschuh ......................... 358/107
4,591,871 5/1986 Ohta ..................................... 346/49
4,658,366 4/1987 Posh .................................... 364/523
4,734,868 3/1988 DeLacy ............................ 364/519

*Primary Examiner*—Gary V. Harkcom
*Assistant Examiner*—Raymond J. Bayerl
*Attorney, Agent, or Firm*—Finnegan, Henderson, Farabow, Garrett, and Dunner

[57] ABSTRACT

A system for printing data on a prescribed record form, which is repetitively inserted into and removed from a printing device, that includes a printing unit for printing the print data on the prescribed record form, a feed control unit for feeding the record form automatically in a prescribed printing position direction, a detection unit for detecting angular misalignment of the record form from a prescribed printing position each time the record form is inserted into the printing device, a print data computation processing unit for computing a corrected printing position from the position data of the detected angular misalignment, and a print control unit for controlling the printing unit to print the print data according to the corrected printing position.

6 Claims, 3 Drawing Sheets

DATA PRINTING SYSTEM WITH PRINTING POSITION CORRECTION FUNCTION

This application is a continuation of application Ser. No. 515,328, filed Apr. 27, 1990, now abandoned, which is a continuation of application Ser. No. 238,230, filed Aug. 26, 1988, now abandoned.

BACKGROUND OF THE INVENTION

This invention relates to a data printing system, and more particularly to a system having a printing position adjustment mechanism.

In a hospital data processing system, printing and recording of time sequential data relating to the condition of a patient is carried out forms, such as temperature charts. Specifically, daily measurement data (blood pressure, body temperature, pulse rate, etc.) of an admitted patient are input to a data processing device, and subsequently printed as a time sequential data curve on a temperature chart for each patient, using a printing device.

The printed temperature chart is removed from the printing device and handed over to a doctor or nurse, to be used as data for deciding on what medical action is to be taken on the next day. Subsequently, the temperature chart is then again inserted into the printing device, so that the measurement data of the next day can be printed as a continuation of the data curve up to the current day.

In order for the printed data curve to continue correctly, it is necessary to position the printing form accurately at the same position on the printer as on the previous occasion. However, with manual position adjustment using a position marker, it is not possible to align precisely the end point of the preprinted form on repeated insertions and removals. This makes accurate position adjustment difficult, and position adjustment of a large number of pre-printed forms time consuming, thereby increasing the load on the nursing staff.

SUMMARY OF THE INVENTION

It is an object of this invention to carry out printing data in a suitable position on a record form automatically.

Another object of this invention is to carry out printing data in a suitable position by automatically correcting position displacement (e.g., angular misalignment) between the position in which a record form is set and its prescribed position.

Additional objects and advantages will be obvious from the description which follows, or may be learned by practice of the invention.

The foregoing objects are achieved according to the present invention by providing a system for printing data on a prescribed record form, which is repetitively inserted into and removed from a printing device, that includes a printing unit for printing the data on the prescribed record form, a feed control unit for feeding the record form automatically in a prescribed printing position direction, a detection unit for detecting displacement of the record form from a prescribed printing position each time the record form is inserted into the printing device, a print data computation processing unit for computing a corrected printing position from the position data of the detected displacement, and a print control unit for controlling the printing means to print the data according to the corrected printing position.

According to another aspect of the present invention, the above objects are achieved by providing a method of printing data on a prescribed record form which is repetitively inserted into and removed from the printing device, that includes the steps of feeding the record form automatically in prescribed printing position direction, detecting displacement of the record form from a prescribed position each time the record form is inserted into the printing device, computing corrected printing position from the position data of the detected displacement, and controlling the printing operation of the data according to the corrected printing position.

Other objects, features, and advantages of the present invention will become apparent from the following detailed description. It should be understood, however, that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

A more complete appreciation of the present invention and many of its attendant advantages will be readily obtained by reference to the following detailed description considered in connection with the accompanying drawings, in which.

DESCRIPTION OF THE PREFERRED EMBODIMENTS

An embodiment of this invention is described below with reference to the drawings.

Figure 1:
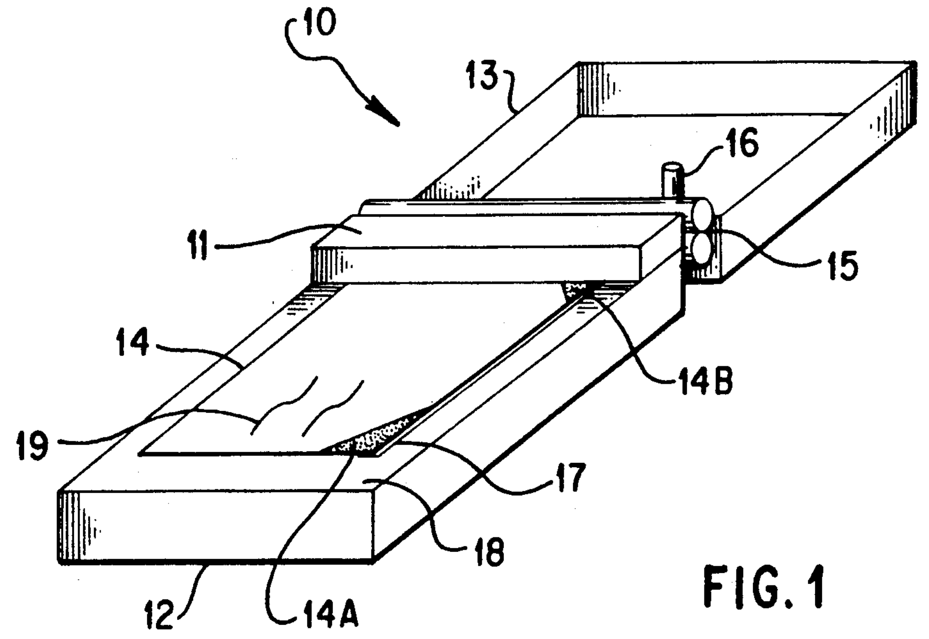
FIG. 1 is a perspective view of a data printing system according to the present invention.

In FIG. 1 a data printing system 10 is equipped with a printer mechanism 11 on a printer body 12. The data printing system 10 includes a print form tray 13 to hold record forms 14 awaiting to be fed on printer body 12. As previously described, the record forms 14 are repetitively inserted into and removed from the printing device, such as to record a patient's temperature over various time intervals. System 10 is further provided with a print form feed roller 15 for automatically feeding record forms and a photosensor 16 for detecting the passing of record forms 14. A printing position marker 17 is marked on a printing platen 18. Also, record forms 14 are marked, at both ends of the forms 14 on one side of the feed direction, with position detection markers 14A, 14B, respectively. A record form 14 having a printed data curve 19 is shown in FIG. 1.

Based on a printing start command from a control part not shown, print forms 14 are taken one at a time from tray 13 and positioned on printing platen 18 after passing through print form feed roller 15. Next, printer mechanism 11 begins printing the current data curve, taking as its starting point the origin of the end point of the data curve printed on the previous occasion. In this case, printer mechanism 11 can be moved in both the longitudinal and width direction relative to printing platen 18.

Figure 2:
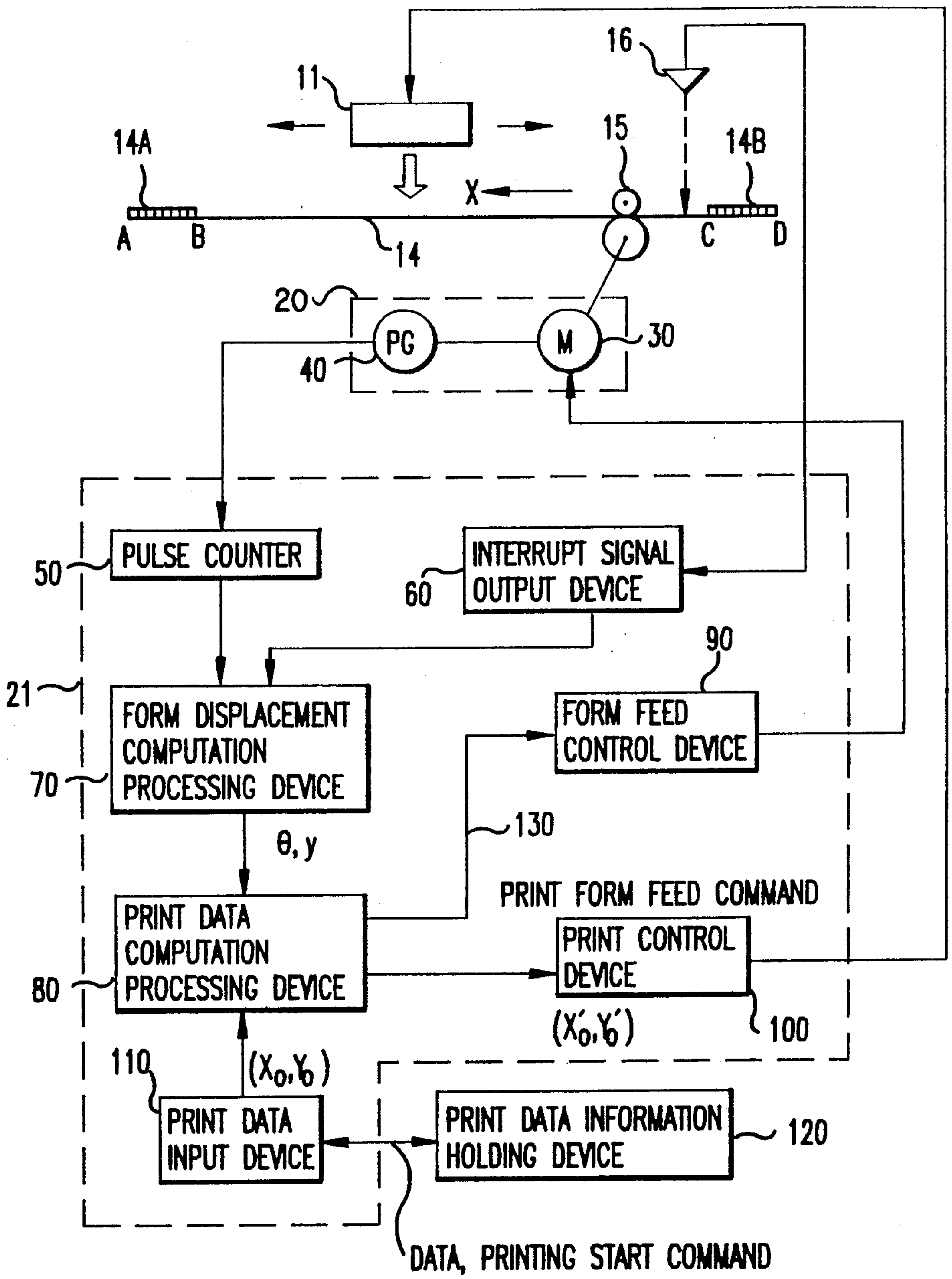
FIG. 2 is a functional block diagram showing the elements of a data printing system according to the invention.

A control part and a drive part for the system shown in FIG. 1 are shown in FIG. 2. In FIG. 2, a drive part 20 is connected to print form feed roller 15 and to a control part 21. Control part 21 is, in turn, connected to printer mechanism 11 and to photosensor 16. The drive part 20 includes a stepping motor 30 for driving print form feed roller 15 and a pulse generator 40 for generating pulses according to the rotating angle of stepping motor 30, linked to motor 30. Control part 21 includes a pulse counter 50 for counting the number of received pulses, and an interrupt signal output device 60 for generating interrupt signals according to the change of signal level detected by photosensor 16. Control part 21 is further provided with a form displacement computation processing device 70, and a print data computation processing device 80. Form displacement computation processing device 70 detects a form displacement from a fixed printing position marked partly by print position marker 17 shown in FIG. 1 according to the number of pulses counted by pulse counter 50 between interrupt signals generated by the interrupt signal output device 60. Print data computation processing device 80 computes a corrected printing position of data to be printed from the detected form displacement. In a presently preferred embodiment, devices 70, 80 are constituted by a CPU and peripheral devices such as memory, bus, and I/O unit. However, other data processing systems may be employed without departing from the spirit or scope of this invention.

Control part 21 further includes a form feed control device 90 for controlling stepping motor 30 in response to a print form feed command 130 or a stop command from print data computation processing device 80, a print control device 100 for controlling printer mechanism 11 to print data to be printed according to the corrected printing position computed by print data computation processing device 80, and a print data input device 110 for controlling the input of the data and the printing start command into print data computation processing device 80, and the output of data printed into a print data information holding device 120. Print data information holding device 120 holds the data to be printed and data printed.

An explanation of the flow of operation is given below. The data that is to be printed is stored in the print data information holding device 120 through print data input device 110. When the print start command is input through the print data input device 110 to the print data computation processing device 80, device 80 outputs a print form feed command 130 to form feed control device 90. In response to this command 130, form feed control device 90 starts the stepping motor 30 and extracts a print form 14 that was previously positioned in print form tray 13. The extracted print form 14 is fed to the printer platen in the X-direction by print form feed roller 15 driven by stepping motor 30.

Figure 3:
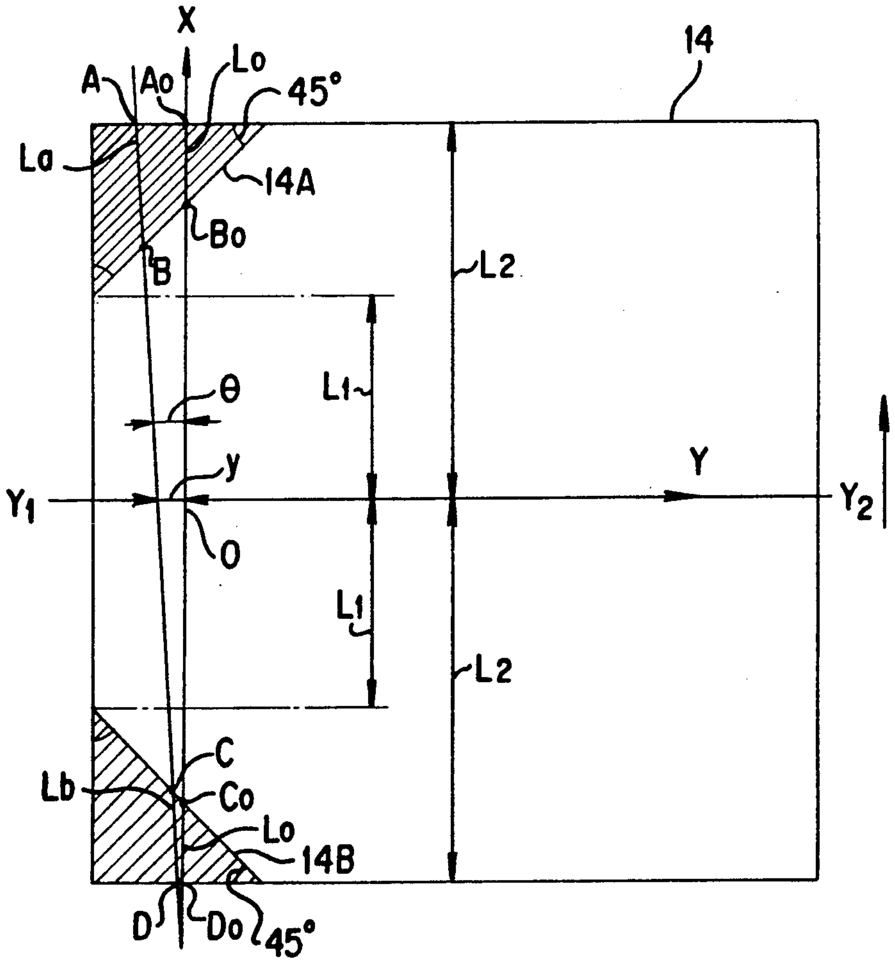
FIG. 3 is a view showing position detection markers for a record form according to the invention.

Triangular fixed position detection markers 14A and 14B as best seen in FIG. 3 are printed at both ends of the form on one side of the feed direction. Referring to FIGS. 2 and 3, a plurality of points A, B, C, D are selected and positioned at the ends of fixed position detection markers 14A and 14B. Markers 14A and 14B, which are printed on print form 14, are sequentially detected by photosensor 16 and respective interrupt signals are generated for each. When four interrupt signals have been generated, the stepping motor 30 is stopped in response to the stop signal from form feed control device 90, and print form 14 is automatically set in the printing position. As explained further below, markers 14A, 14B and detection of points A–D herein are used to determine and adjust the position of form 14 so that printing of data can be accurately done.

Specifically, when photosensor 16 scans fixed position detection markers 14A, 14B, its scanning line crosses markers 14A, 14B at four discrete points. The four points are A, B, C, D, respectively as shown in FIG. 3. When record form 14 is adjusted to pass along the fixed, i.e., desired, printing position, points A, B, C and D coincide with the desired printing position points, denoted Ao, Bo, Co and Do in FIG. 3.

A form displacement computation sequence is explained below in order to achieve this desired placement of form 14. Essentially the distance $L_a$ between end points A and B, and the distance $L_b$ between end points C and D are found by using pulse counter 50 to count the number of pulses generated between respective interrupt signals corresponding to each of points A and B and C and D by a pulse generator 40 linked to the stepping motor 30. Distances $L_a$ and $L_b$ are then used to determine the position of form 14 so that printing can occur exactly as desired.

Figure 4:
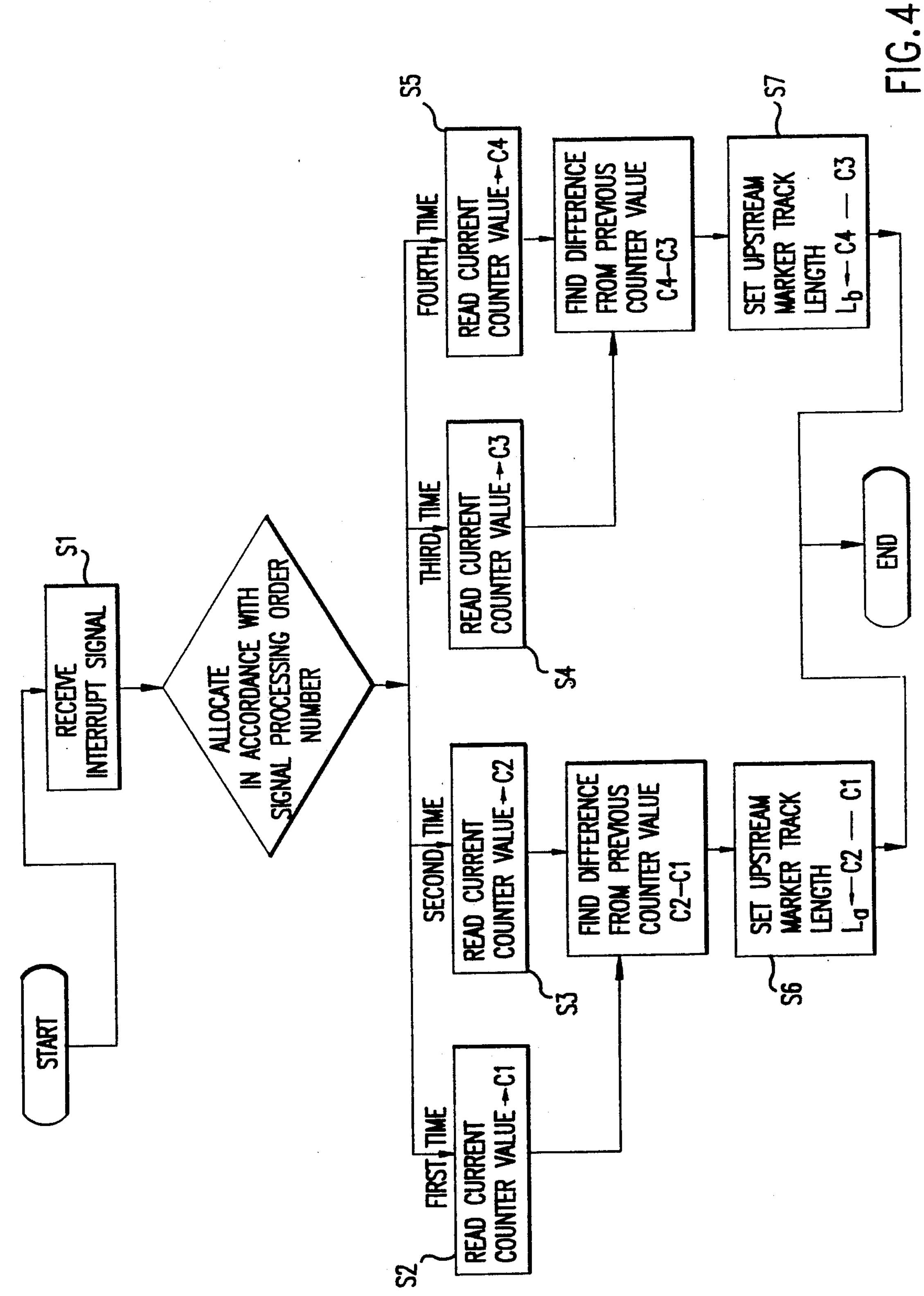
FIG. 4 is a flow chart showing a position displacement calculation using the position detection markers of FIG. 3.

FIG. 4 shows a flow chart of the operations involved in the above sequences. The photosensor 16 detects a change in signal level while record form 14 passes below photosensor 16 so as to provide an interrupt signal for each point A–D. In step S1, these interrupt signals, which are generated by interrupt signal output device 60, are received by processing device 70.

In step S2, a counter value C1 counted by pulse counter 50 corresponding to the marker end point A is read, and is stored in the memory of the form displacement computation processing device 70. Because point A is the first point encountered by photosensor 16, this step corresponds to a "first time" operation.

In steps S3, S4 and S5, corresponding to operations relating to the second and subsequent times, counter values C2, C3 and C4 are read and stored in the memory of device 70. Values C2, C3 or C4 are representative of the subsequent marker end points B, C, D in the same manner as described above with respect to counter value C1 and point A. In steps S6 and S7, the aforementioned distances $L_a$ and $L_b$ are found from: $L_a = C2 - C1$ and $L_b = C4 - C3$.

As described above, when print form 14 is correctly positioned on the printer platen, end points A, B, C and D coincide with positions Ao, Bo, Co, and Do. If such coincidence is not present, however, then the line defined by end points A–D will be offset from that defined by desired points Ao–Do. In the example shown in FIG. 3, track A-B-C-D is offset by angle $\theta$ with respect to track Ao-Bo-Co-Do. In this example, it is assumed that $L_a = L_b = L_o$; however, other deviations may be corrected for in accordance with the present invention.

In FIG. 3, taking Do, Co, Bo and Ao as the X-axis, and $Y_1$–$Y_2$ as the Y-axis, and the coordinates of A, B, C and D as $(X_A, Y_A)$, $(X_B, Y_B)$, $(X_C, Y_C)$, and $(X_D, Y_D)$, we have:

$$X_A = L_2,\ Y_A = L_2 \cdot \tan\theta + y \quad (1)$$

$$X_B = \frac{L_o + L_2 - y}{1 + \tan\theta},\ Y_B = \frac{(L_o + L_2)\tan\theta + y}{1 + \tan\theta}$$

-continued $$X_C = \frac{y - L_o - L_2}{1 + \tan\theta},\ Y_C = \frac{y - (L_a + L_2)\tan\theta}{1 - \tan\theta}$$

$$X_D = -L_2,\ Y_D = (-L_2 \cdot \tan\theta) + y$$

$L_a$ and $L_b$ can therefore be expressed as follows in the X, Y coordinates:

$$L_a^2 = (X_A - X_B)^2 + (Y_A - Y_B)^2 \quad (2)$$

$$L_b^2 = (X_C - X_D)^2 + (Y_C - Y_D)^2$$

Substituting equation (1) into equation (2) and solving for tan θ and Y, while neglecting the second order and higher terms in tan θ and Y, θ and y are respectively:

$$\theta = \tan^{-1}\frac{L_a^2 - L_b^2}{(4L_o \cdot L_2) - 2(L_a^2 + L_b^2)} \quad (3)$$

$$y = \frac{1}{2L_o}\left\{ L_a^2 - L_o^2 + \frac{(L_a^2 - L_b^2)(2L_a^2 - 2L_o \cdot L_2)}{(4L_o \cdot L_2) - 2(L_a^2 + L_b^2)} \right\} \quad (4)$$

Consequently θ and y can be expressed from $L_a$ and $L_b$, respectively.

The above calculation is performed by the form computation processing device 70 shown in FIG. 2. The results of the computation, namely, θ and y, are input to the print data computation processing device 80. Device 80 computes a corrected print position using the form displacement data θ and Y.

The method of computing the corrected print position will now be described. The data that is to be printed on this occasion is extracted from the print data information holding device 120 and supplied to the print data computation processing device 80 through the print data input device 110. If the print form on which this print data is to be printed has not undergone displacement, and using a coordinate system centered at point O, taking the coordinates of the printing point as ($X_o$, $Y_o$), we have:

$$X_o = R_o \cdot \cos\theta \quad (5)$$

$$Y_o = R_o \cdot \sin \tfrac{1}{4}$$

where $$R_o = \sqrt{X_o^2 + Y_o^2} \quad (6)$$

$$\cos\theta_o = \frac{X_o}{\sqrt{X_o^2 + Y_o^2}}$$

$$\sin\theta_o = \frac{Y_o}{\sqrt{X_o^2 + Y_o^2}}$$

Consequently, when form displacement θ and y occur, the coordinates ($X_o$, $Y_o$) of the print point corresponding to ($X_o$, $Y_o$) are:

$$X_o' = R_o \cos(\theta_o + \theta)(7)$$

$$Y_o' = [R_o \sin(\theta_o + \theta)] + y$$

The print data computation device 80 performs a computation in accordance with the above equation (7) for each print data input ($X_o$, $Y_o$). The result ($X_o'$, $Y_o'$) of this computation is sent to the print control device 100. The device 100 performs printing through the printer mechanism 11 according to the signal from print data computation processing device 80, thereby correcting the aforementioned print form displacements θ, y.

Numerous modifications and variations of the present invention are possible in light of the above teachings. It is therefore to be understood that, within the scope of the appended claims, the present invention can be practiced in a manner other than as specifically described herein.

What is claimed is:

1. A system for printing print data on a prescribed record form, the form including at both ends a plurality of fixed detection markers each having a predetermined shape, the form being inserted into and removed from a printing device a plurality of times, comprising:

printing means for printing the print data on the prescribed record form, said printing means being moveable in both a longitudinal direction and a width direction relative to the record form;

feed control means for feeding the record form automatically in a prescribed printing position direction, said feed control means stopping further feeding of the record form once the record from has reached a prescribed printing position;

detection means for detecting the position of said fixed detection markers on the record form to determine, in response to the predetermined shape of said fixed detection markers, any angular misalignment of the record form relative to said prescribed printing position each time the record form is fed into the printing device by said feed control means;

print data computation processing means coupled to said detection means for computing, based upon the angular misalignment detected by said detecting means, position data corresponding to a corrected printing position for the record form; and print control means for controlling the printing means in said longitudinal and width directions in response to said position data to print the print data at the corrected printing position.

2. The system of claim 1 wherein said fixed position detection markers are triangular in shape and are printed on one side of the form.

3. The system of claim 1 wherein the feed control means includes a print form feed roller for feeding a record form automatically in a prescribed printing position direction, a stepping motor for driving the print form feed roller, and a form feed control device for controlling the stepping motor.

4. The system of claim 3 wherein the detection means includes a photosensor for detecting a change in signal level every time end points of the triangular fixed position detection markers sequentially pass below the photosensor, a pulse generator linked to the stepping motor for generating pulses according to the operating speed of the stepping motor, a pulse counter for counting the number of pulses generated by the pulse generator, a interrupt signal output device for generating an interrupt signal when the photosensor detects the change in signal level, and a form displacement computation processing device for computing angular misalignment of the record form from a prescribed printing position based on a predetermined computation formula using the numerical relationship between the pulse generated by the pulse generator and the interrupt signals.

5. A method of printing print data on a prescribed record form, the form having at both ends a plurality of fixed detection markers each having a predetermined shape, the form being inserted into and removed from a printing device a plurality of times, comprising the steps of:

feeding the record form automatically in a prescribed direction to reach a prescribed printing, position;

detecting, in response to the predetermined shape of the fixed detection markers on the record form, angular misalignment of the record form from said prescribed position each time the record form is inserted into the printing device;

generating, from the detected angular misalignment of the record form, position data corresponding to a corrected printing position; and controlling a printing mechanism, including selective movement of said printing mechanism in a longitudinal direction and width direction relative to the record form, in response to the position data to print the print data according to the corrected printing position.

6. The method of claim 5 wherein the step of controlling includes the step of printing the print data on the prescribed record form.

* * * * *

UNITED STATES PATENT AND TRADEMARK OFFICE

CERTIFICATE OF CORRECTION

PATENT NO. : 5,101,473
DATED : March 31, 1992
INVENTOR(S) : Kozi Kotaki

It is certified that error appears in the above-identified patent and that said Letters Patent is hereby corrected as shown below:

Claim 1, column 6, line 25, after "record" change "from" to --form--.

Claim 2, column 6, line 44, after "fixed" delete "position".

Claim 4, column 6, line 55, delete "triangular".

Claim 4, column 6, line 55-56, delete "position".

Claim 4, column 6, line 60, change "a" to --an--.

UNITED STATES PATENT AND TRADEMARK OFFICE

CERTIFICATE OF CORRECTION

PATENT NO. : 5,101,473

DATED : March 31, 1992

INVENTOR(S) : Kozi Kotaki

It is certified that error appears in the above-indentified patent and that said Letters Patent is hereby corrected as shown below:

Claim 5, column 7, line 8, after "printing" delete ",".

Signed and Sealed this

Twenty-sixth Day of October, 1993

*Attest:*

Bruce Lehman

BRUCE LEHMAN

*Attesting Officer* *Commissioner of Patents and Trademarks*